3,232,977
METHOD OF PRODUCING ACRYLONITRILE AND METHACRYLONITRILE
Heinz König, Linz, Rupert Schönbeck, near Linz, and Friedrich Straberger, Wels, Austria, assignors to Osterreichische Stickstoffwerke Aktiengesellschaft, Linz, Austria
No Drawing. Filed June 12, 1962, Ser. No. 201,749
Claims priority, application Austria, June 20, 1961, A 4,752/61
3 Claims. (Cl. 260—465.3)

This invention relates to a novel method of producing acrylonitrile and methacrylonitrile.

It has already long been known that unsaturated aliphatic nitriles, more particularly acrylonitrile, can be produced in a favorable manner by the reaction of olefins, for example propylene, with ammonia and oxygen. This method was adopted particularly because, firstly, a cheap material could be used, for example, propylene, while secondly it was possible to avoid operating with large quantities of poisonous hydrocyanic acid and explosive acetylene. Oxidation catalysts were first recommended for this reaction, particularly compounds containing molybdenum and vanadium, which were known from the oxidation of benzene to form maleic acid anhydride. The resultant yields, however, were always far below 30%, even as low as 6% in the case of the reaction of propylene with ammonia and oxygen to form acrylonitrile, with respect to the olefin used, so that it was not possible to perform the method economically and hence it could not compete with other known methods of producing acrylonitrile.

According to a recent process it has been proposed to react propylene with ammonia and oxygen using catalysts of tin molybdate or bismuth molybdate, tin phosphomolybdate or bismuth phosphomolybdate, or bismuth phosphotungstate, preferably on silicic acid supports, while bismuth phosphomolybdate should be particularly emphasized. These new catalysts gave considerable improvements in the yield and in fact, with the use of bismuth phosphomolybdate, up to 50% with respect to propylene used. Practical details of this method are available, however, only for fluidized bed processes.

It is well known that fluidized bed processes are suitable only for high-capacity installations. A fixed bed is preferable to the fluidized bed for small and medium-size installations, since the reactor loading can be varied within much wider limits and the yield per square centimeter of furnace cross-section is higher. Thus, for example, if propylene is reacted with ammonia and oxygen under otherwise completely identical conditions and reaction rates in the fluidized bed unit of time per square centimeter of furnace cross-section, the amount of acrylonitrile obtained practically is only half the amount obtained per unit of time per square centimeter of furnace cross-section in the case of a fixed bed. A further disadvantage of the fluidized bed process is the high catalyst abrasion, which is due to the movement of the grains and which necessitates catalyst recovery systems which are economic only in the case of large installations. The known bismuth phosphomolybdate catalysts which have proved to give the best yield have the disadvantage that when they are used with a fixed bed the reaction that they catalyse is difficult to control and, on the one hand, sudden undesirable general temperature increases and on the other hand local overheating must be expected with consequent loss of yield. The method of producing acrylonitrile from propylene, ammonia and oxygen was therefore not practical satisfactorily in a fixed bed heretofore, since it was impossible or else only very difficult to prevent the exothermic reaction from getting out of hand with resultant total burning.

An increase in yield in comparison with the known fluidized bed process was also desirable since with only a 50% conversion in the case of a single operation the recovery and purification of relatively considerable proportions of non-reacted olefin is a great economic burden. Certain measures intended to increase the yield, for example a slight increase in reactor temperature, were obstructed by the difficult controllability of the reaction when the known catalyst was used.

It has now surprisingly been found that the reaction of propylene or isobutylene with ammonia and oxygen in a fixed bed can be performed in readily controllable manner using a bismuth phosphomolybdate catalyst on silica gel as a support if the catalytically active constituents together with the support are applied as a coating to compact crystalline contact cores of a grain size of from 1 to 8 mm. and of a porosity of 10% maximum. It has even been found that with the fixed bed process according to the invention it is not only possible to obtain better space-time yields and better yields per kilogram of active catalyst substance, but also better yields with respect to the amount of olefin used, than with the known fluidized bed process.

The present invention accordingly relates to a method of producing acrylonitrile and methacrylonitrile, that is, a compound of the formula

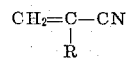

wherein R is hydrogen or methyl, which comprises reacting propylene or isobutylene, that is, a compound of the formula

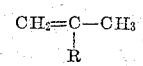

wherein R has the same significance as above, ammonia and oxygen at a temperature within the range of 400° to 520° C. in a fixed bed and in the presence of a catalyst which contains bismuth phosphomolybdate on a silicic acid support, the said catalyst being applied as a coating to compact crystalline contact cores having a grain size of from 1 to 8 mm. and a maximum porosity of 10%.

The nature of the contact cores is of considerable importance to the method according to the invention. Only compact crystalline cores are suitable, while if the porosity exceeds 10% a considerable reduction of yield results. While 0 to 62% conversions to acrylonitrile are obtained under conditions in which use is made of a catalyst containing a corundum or quartz core having a porosity of less than 10%, the conversions to acrylonitrile are only 45–55%, with respect to the propylene used, with catalysts the active material of which is coated on partially sintered tablets or granulates of the same material but with a porosity of 10 to 25%. If commercial aluminum oxide or aluminum silicate supports of a porosity of 40 to 50% are coated with the catalytically active material, the degree of conversion drops to 30 to 32% acrylonitrile. The fact that not only the porosity but also the crystallinity is essential to the good properties of the catalysts according to the invention will be apparent from the fact that catalysts made by coating non-porous but naturally non-crystalline glass balls give only a 35% conversion to acrylonitrile.

The following may be mentioned by way of example of low-porosity crystalline materials suitable for the production of the catalysts according to the invention: compactly fired and mainly crystalline aluminum silicate, corundum, quartz, sintered magnesite, spinel, feldspar and granite. Of course, any other inert material of a predominantly crystalline nature is suitable if it satisfies the requirements concerning porosity. The grain size of the cores may vary between 1 and 8 mm., the grain sizes used preferably being from 2 to 5 mm.

Since the reaction can easily be controlled when a catalyst according to the invention is used, it is possible to raise the reaction temperature from 450° C. to 470° C. to 480° C. and hence obtain higher yields.

It has also been found that the yield of the method according to the invention can be further increased if bismuth phosphomolybdate is not used alone as the active catalyst constituent, but if compounds of beryllium, calcium, strontium, barium, zinc, cadmium, lithium, sodium or silver, by themselves or in combination with one another, are added in the finely divided state to the active substance of the catalyst. The atomic ratio of these metals to molybdenum may be 30:100. Suitable compounds of these metals are, for example, oxides, hydroxides, nitrates, acetates, silicates or phosphates, the use of nitrates being particularly advantageous because of their ready solubility. This favourable activity of the said metals of the first and second groups of the periodic system is extremely surprising since it is known from literature that catalysts containing heteropoly acids or their salts as essential constituents are seriously impaired by just small quantities of alkali metal or alkaline earth metal compounds. It has also been found that this harmful effect really does occur with magnesium, potassium and copper, in great contrast to the favourable effect of the addition of compounds of beryllium, calcium, strontium, barium, zinc, cadmium, lithium, sodium or silver.

In the catalyst according to the invention, the catalytically active constituents are only in the form of coatings on the grain surface. As a result of this situation of the active substance near the surface, local overheating is avoided by the temperature-equalizing function of the cores, while the gas diffusion paths are reduced. Moreover, in this way it is possible to produce catalyst grains having greater or reduced degrees of activity by applying coatings of different thicknesses. According to a particularly preferred embodiment of the present invention, a plurality of catalyst coatings of increasing activity are incorporated in a fixed bed reactor. If the reactor is fed with a catalyst of unitary activity, as was previously the case with catalysts which, in comparison with the catalyst according to the invention, are of a unitary structure instead of being in the form of coatings, a disadvantage found with a moderately active catalyst is that a large reaction chamber and a very low gas throughput have to be used to obtain an adequately long dwell time and hence the maximum yield. If, on the other hand, highly active catalysts are used, the reaction is so violent at the beginning, that the bath temperature of the reactor in which the liberated heat is dissipated, for example, in a salt bath, has to be reduced to such an extent that it is too low for those sections of the reactor in which the partially reacted gas is to react still further in order to improve the yield. In consequence, a considerable part of the reactor remains unused for the reaction and poor yields result. With the catalyst according to the invention it is possible to produce catalysts of different activity using one and the same catalyst material, without any alteration of the composition simply by varying the thickness of the coating on the core, so that the activity of the catalysts may be adapted to the course of the reaction. It has been found advantageous to use thinly coated and hence moderately active catalysts for the first catalyst layer encountered by the fresh starting gas, while more thickly coated highly active catalysts are used for the following layers for the completion of the reaction of the gas mixture. By this ideal adaptation of the catalyst activity to the course of the reaction it is possible to increase the conversion to acrylonitrile still further, to 70% and more, with respect to propylene used.

In these conditions it is possible to dispense with the expensive recovery of the non-reacted propylene.

The active catalyst material used to coat the compact cores may be produced by known methods by jointly heating bismuth nitrate, phosphoric acid, molybdic acid, nitric acid and silicic acid sol. The additions of the mono- or divalent metals may be made either in soluble form or in a finely divided insoluble form. It has been found, however, that very active catalysts are obtained if, in comparison with known methods, phosphododecamolybdic acid is used instead of molybdic acid and phosphoric acid mixtures, as starting material, the former being mixed with bismuth nitrate, nitric acid and silicic acid in sol form. The resultant mixture, to which, if required, it is also possible to add nitrates of beryllium, calcium, strontium, barium, zinc, cadmium, lithium, sodium and/or silver, is sprayed onto the compact crystalline cores in the required coating thickness at temperatures of 100° to 200° C. The catalyst ready for use is then obtained by heating the resultant coated cores for several hours at temperatures of 300° to 500° C.

The following examples illustrate the invention:

EXAMPLE 1

A stock solution is prepared containing, per litre, 284 g. of phosphododecamolybdic acid, 200 g. of silicic acid in sol form, 524 g. of bismuth nitrate, $Bi(NO_3)_3 \cdot 5H_2O$, and 80 cc. of concentrated nitric acid. 2 kg. of melted corundum or sintered corundum of a grain size of 3 to 4 mm. and having a porosity of 5% by volume are then sprayed with 500 cc. of stock solution in a rotary drum heated to 150° C. The coated corundum is then slowly brought to a temperature of 350° C. with admission of air, and is kept at this temperature for 4 hours. It is then heated another 16 hours at 450° C.

530 g. of this catalyst is contacted in a fixed bed tubular furnace with a gas mixture containing 1 part by volume of propylene, 1 part of ammonia, 1 part of steam and 7.5 parts of air. The gas speed is 39 normal litres per hour and per sq. cm. of tube cross-section, the maximum reaction temperature is 465° C. Under these conditions 60% of the propylene used is converted to acrylonitrile and 4% to acetonitrile. Hydrogen cyanide and carbon oxides are given off as further by-products.

The following table compares the characteristic values of the above example: (A) according to the invention, (B) with a fluidized bed process corresponding to the prior art, and (C) an embodiment of the solid bed process using a coreless catalyst. The two catalysts used in methods B and C were prepared by drying the stock solution, heat treatment as in the case of the contact for the method A according to the invention, comminution and screening to grain size of 0.15 to 0.4 mm. and 3 to 4 mm. respectively. In the case of method C the amount of steam had to be increased to 4.3 parts by volume to keep the reaction under control. The maximum reaction temperature was 455° C. in Examples B and C.

*Table*

| Method | A | B | C |
|---|---|---|---|
| Catalyst | Solid bed on core | Fluidised bed homogeneous | Solid bed homogeneous |
| Gas speed in normal liters per hour and per sq. cm. furnace cross-section | 39 | (less than 30) | 51 |
| Percent of propylene converted to acrylonitrile | 60 | 50.2 | 50 |
| Percent of propylene converted to acetonitrile | 4 | 6 | 8 |
| G. of acrylonitrile per hour and per kg. of molybdenum trioxide | 960 | about 100 | 87 |
| G. of acrylonitrile per hour and per sq. cm. reactor cross-section | 5.4 | about 2.6 | 4.5 |

EXAMPLE 2

The catalyst was produced as in Example 1 (method A), but there was also added to the 500 cc. of stock solution a calcium nitrate solution obtaned by dissolving 10.8 g. of calcium carbonate in nitric acid. The degree of conversion to acrylonitrile is 65% under the same conditions as in Example 1.

If, instead of the calcium nitrate solution, 28.2 of barium nitrate, $Ba(NO_3)_2 \cdot H_2O$, or 33.3 g. of cadmium nitrate, $Cd(NO_3)_2 \cdot 4H_2O$, are added, the conversions to acrylonitrile are also 65%. If 9.2 g. of sodium nitrate, $NaNO_3$, is added instead of the calcium nitrate solution, the conversion to acrylonitrile is 64%, while if 18.4 g. of silver nitrate, $AgNO_3$, is added it is 65%.

EXAMPLE 3

Three layers of catalyst are introduced into a fixed bed reactor, as follows consecutively in the direction of flow of the reaction mixture: 80 cm., contact I, 40 cm. contact II, and 40 cm. contact III. Contact I corresponds to the catalyst used in Example 1 (method A). Contacts II and III differ from contact A in that the amount of stock solution applied to the corundum grains was respectively four times and ten times as much. With a normal throughput of 4 liters of propylene per hour and per sq. cm. of contact bed cross-section, a temperature of 460° C. and a gas composition as in Example 1, 67% of propylene were converted to acrylonitrile. The quantity of acrylonitrile discharged per hour and per sq. cm. of contact bed cross-section is 6.05 g. By doubling the gas throughput the acrylonitrile yield can be increased to 10.2 g. per hour and per sq. cm.

EXAMPLE 4

500 cc. of stock solution are applied to 1200 g. of preheated light substantially crystalline clay clinker having an 8% porosity and 2.4 mm. grain size. After heating for 16 hours at 400° to 450° C. a tubular furnace is filled with the catalyst. Under the same reaction conditions as in Example 1, 62% of the propylene used is converted into acrylonitrile using 540 g. of catalyst.

EXAMPLE 5

1400 g. of granite of a grain size of 2 to 4 mm. are used as catalysts cores and 500 cc. of stock solution is applied. The conversion to acrylonitrile is 64% when 630 g. of catalyst is used.

EXAMPLE 6

A fixed bed reactor is charged with 2 contact layers each of a height of 85 cm. The first layer is made by the use of 225 cc. of stock solution per kilogram of melted corundum, while the second is made from 1000 cc. of stock solution per kilogram of melted corundum. The feed gas contains 1 part by volume of propylene, 1 part of ammonia, 3 parts of steam and 6.8 parts of air. With throughput of 45 normal liters of gas mixture per hour and per sq. cm. tube cross-section and a reaction temperature of 470° C., 72% of the propylene used are converted to acrylonitrile and 3% to acetonitrile.

We claim:
1. In a process of producing an unsaturated nitrile of the formula

in which R is selected from the group consisting of hydrogen and methyl by reacting an olefin of the formula

wherein R has the same significance as above with ammonia and oxygen at a temperature between 400° and 520° C. in contact with a bismuth phosphomolybdate catalyst supported on silicic acid, the step of carrying out such reaction with the reaction mixture in contact with a fixed catalyst bed wherein said supported bismuth phosphomolybdate catalyst is coated on crystalline cores having a grain size of 1 to 8 mm. and having a maximum porosity of 10%, said cores consisting of a material selected from the group consisting of aluminum silicate, corundum, feldspar, granite and sintered magnesite.

2. A method according to claim 1 in which the reaction mixture is successively brought into contact with coated crystalline cores, the thickness of the supported bismuth phosphomolybdate coating of which successively increases.

3. A method according to claim 1, in which the catalyst is produced by spraying the crystalline cores having a grain size of 1 to 8 mm. and a maximum porosity of 10% at a temperature within the range of 100° to 200° C. with a mixture consisting of phosphododecamolybdic acid, bismuth nitrate, nitric acid and silicic acid in sol form, and then heating the resulting coated croes for several hours at a temperature within the range of 300° to 500° C.

References Cited by the Examiner

UNITED STATES PATENTS

| | | | |
|---|---|---|---|
| 2,904,580 | 9/1959 | Idol | 260—465.3 |
| 3,009,943 | 11/1961 | Hadley et al. | 260—465.3 |
| 3,126,407 | 3/1964 | Cottle et al. | 260—465.3 |

FOREIGN PATENTS

| | | |
|---|---|---|
| 635,328 | 1/1962 | Canada. |
| 848,924 | 9/1960 | Great Britain. |

OTHER REFERENCES

Berkman et al.: "Catalysis," Reinhold, 1940, pages 456, 478–479.

CHARLES B. PARKER, *Primary Examiner.*